United States Patent [19]
Sheu

[11] Patent Number: 5,613,301
[45] Date of Patent: Mar. 25, 1997

[54] TREE PRUNER

[76] Inventor: Jeff Sheu, 1F,No.20,Lane 20, Hsin Tung Street, Taipei, Taiwan

[21] Appl. No.: 635,724

[22] Filed: Apr. 22, 1996

[51] Int. Cl.$^6$ ...................................................... B26B 13/22
[52] U.S. Cl. ............................................................ 30/144
[58] Field of Search ..................... 30/392–394, 188–190, 30/249–251, 144

[56] References Cited

U.S. PATENT DOCUMENTS

| | | | |
|---|---|---|---|
| 96,294 | 10/1869 | Woodworth | 30/251 |
| 1,023,093 | 4/1912 | Ottinger | 30/251 X |
| 2,563,264 | 8/1951 | Norgard | 30/392 X |
| 3,657,813 | 4/1972 | Knight | 30/392 X |

*Primary Examiner*—Douglas D. Watts
*Attorney, Agent, or Firm*—Bacon & Thomas

[57] ABSTRACT

A tree pruner comprises a support rod and a cutting set. The support rod is provided at the top end thereof with a slide seat fastened thereto. The cutting set has a fastening piece fastened with a slide block capable of sliding on the slide seat. Fastened with the fastening piece is a pull rod which has a bottom end disposed pivotally in a slot of a rocking rod. The rocking rod is provided at one end thereof with a grip and is fastened pivotally at another end thereof with two connection rods which are fastened with the support rod. As the rocking rod is swung up and down, a saw which is fastened wiht the fastening piece is caused to move likewise so as to prune a twig off the tree.

6 Claims, 6 Drawing Sheets

5,613,301

TREE PRUNER

FIELD OF THE INVENTION

The present invention relates generally to a cutting device for removing dead or living parts from a plant, and more particularly to a tree pruner.

BACKGROUND OF THE INVENTION

As shown in FIG. 6, a tree pruner of the prior art is intended for use in removing dead or living twigs from a shade or fruit tree so as to improve its form or to increase the fruit or flower production. The prior art tree pruner comprises a support rod 80 which is provided at the top end thereof with a fitting body 81 fastened securely thereto. Fastened with the fitting body 81 is a cutting set 90, which comprises a fixation piece 91 fastened securely with the fitting body 81. The fixation piece 91 has one end which extends to form an arcuate portion 910. The fixation piece 91 has another end which is provided with a pivoting piece 92. Located between the pivoting piece 92 and the fixation piece 91 is a tension spring 93. The cutting set 90 further comprises a cutting blade 94 capable of cooperating with the arcuate portion 910, and a pull cord 95 having one end which is fastened with the fitting body 81 such that the pull cord 95 is wound on the pulleys 96, 97 and 98. In operation, when the pull cord 95 is pulled downwards, the pivoting piece 92 is actuated to swivel so as to cause the cutting blade 94 to move to cut a twig in conjunction with the arcuate portion 910 of the fixation piece 91. The cutting blade 94 is then forced back to its initial position by the tension spring 93. The fixation piece 91 is further povided with a saw 99 fastened therewith for removing a coarse twig that can not be removed easily by the blade 94.

Such a prior art tree pruner as described above is defective in design in that a twig can not be removed easily by the saw 99 of the tree pruner of the prior art. In other words, it is a rather strenuous chore for a person holding the support rod 80 to remove a tree twig by means of the saw 99.

SUMMARY OF THE INVENTION

It is therefore the primary objective of the present invention to provide an improved tree pruner, which comprises a support rod provided at the top end thereof with a slide seat on which a slide block is mounted slidably. The slide block is provided with a fixation piece having a cutting set. Pivoted with the bottom end of the fixation piece is a pull rod which has another end pivoted in a long slot of a rocking rod. The rocking rod is fastened pivotally at one end thereof with a connection rod extending from the support rod. In operation, the pull rod is actuated by the motion of the rocking rod to move up and down so as to push the slide block to slide up and down along the slide seat, thereby causing the saw, which is fastened with one end of the fixation piece, to move up and down so as to cut a tree twig.

The foregoing features, structures, functions and advantages of the present invention will be more readily understood upon a thoughtful deliberation of the following detailed description of a preferred embodiment of the present invention in conjunction with the accompanying drawings.

DETAILED DESCRIPTION OF THE EMBODIMENT

Figure 1:
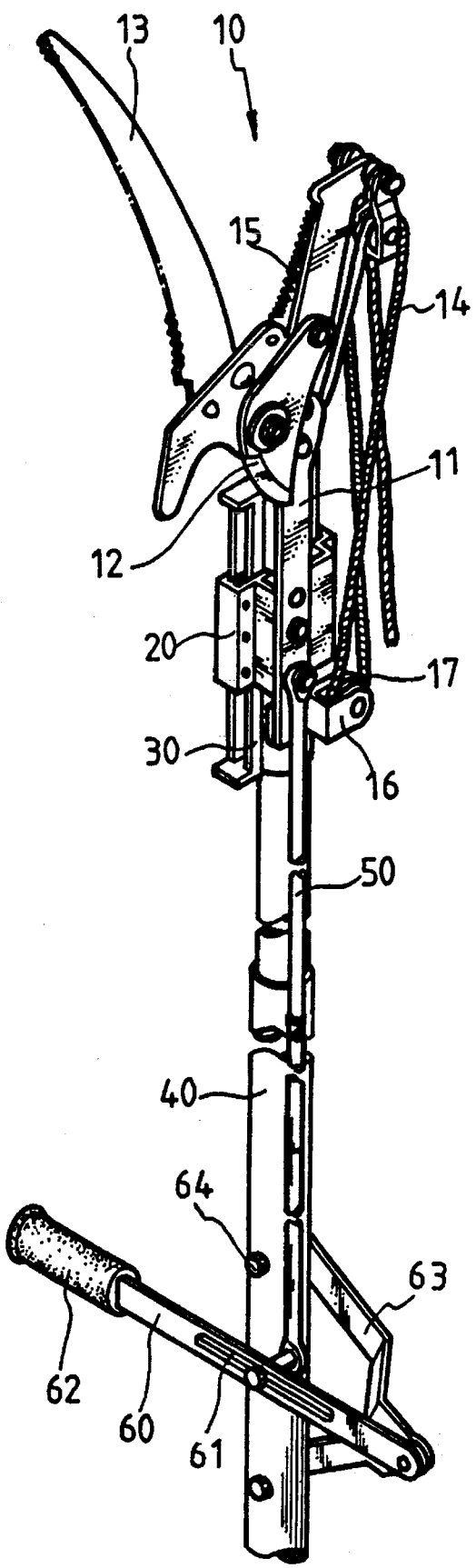
FIG. 1 shows a perspective view of the preferred embodiment of the present invention.

As shown in FIG. 1, a tree pruner embodied in the present invention comprises a cutting set 10 which is similar in construction to the cutting set of the prior art tree pruner. The cutting set 10 has a fixation piece 11, a cutting blade 12 fastened pivotally with the fixation piece 11, a saw 13 fastened with the fixation piece 11, a pull cord 14 for moving the cutting blade 12, and a tension spring 15. The tree pruner of the present invention is characterized in that the cutting set 10 is mounted on a slide block 20 by means of the fixation piece 11. The slide block 20 is mounted slidably on a slide seat 30 which is fastened securely at the top end of a support rod 40. In addition, the fixation piece 11 is provided at the bottom end thereof with a pull rod 50 pivoted thereto. The pull rod 50 has a bottom end which is received pivotally in a long slot 61 of a rocking rod 60. The rocking rod 60 is provided at one end thereof with a grip 62 and is fastened pivotally at another end thereof with two connection rods 63 which are in turn fastened respectively at another end thereof with the support rod 40.

Figure 2:
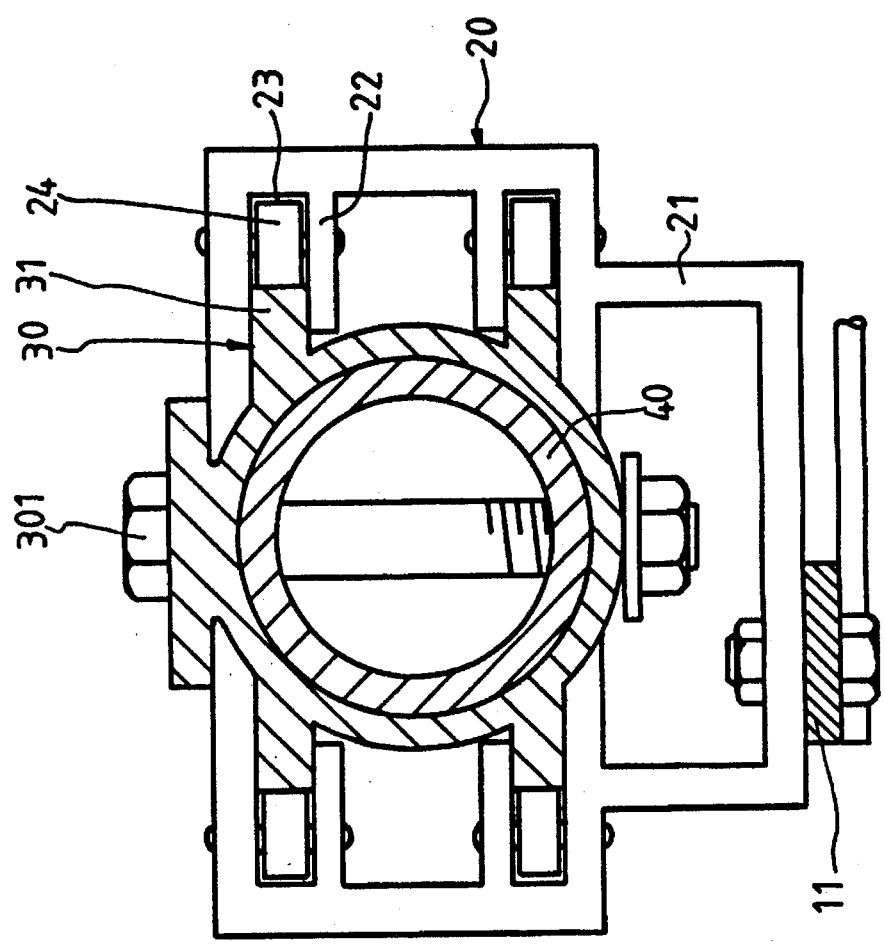
FIG. 2 shows a sectional schematic view of the slide seat and the slide block of the present invention in combination.

As shown in FIG. 2, the slide seat 30 is of a hollow construction and is fastened securely with the support rod 40 by means of a fastening bolt 301. The slide seat 30 is provided with four slide rails 31 extending from the periphery of the slide seat 30 for enabling the slide block 20 to slide up and down.

The slide block 20 is of a rectangular and hollow construction and is provided on one side of its periphery with a U-shaped frame 21 having an open space in which the head of the fastening bolt 301 is received. The frame 21 is fastened with the fixation piece 11 by means of a fastening bolt. The slide block 20 is further provided with four ribs 22 extending from two short sides of the slide block 20 such that four ribs 22 are parallel to two long sides of the slide block 20 and that each of four ribs 22 and one long side of the slide block 20 form therebetween a slide slot 23 in which the slide rail 31 is located. A rolling wheel 24 is located in the slide slot 23 such that the rolling wheel 24 is capable of sliding on the slide rail 31 so as to enable the slide block 20 to move up and down along the slide seat 30.

Figure 3:
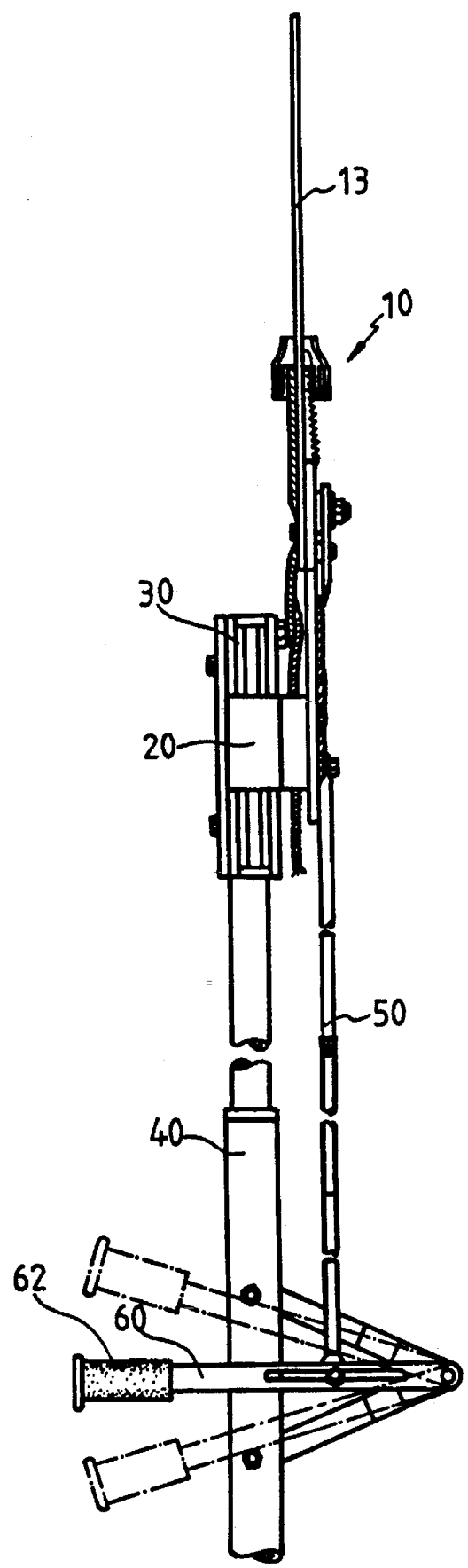
FIG. 3 shows a front schematic view of the present invention at work.
Figure 4:
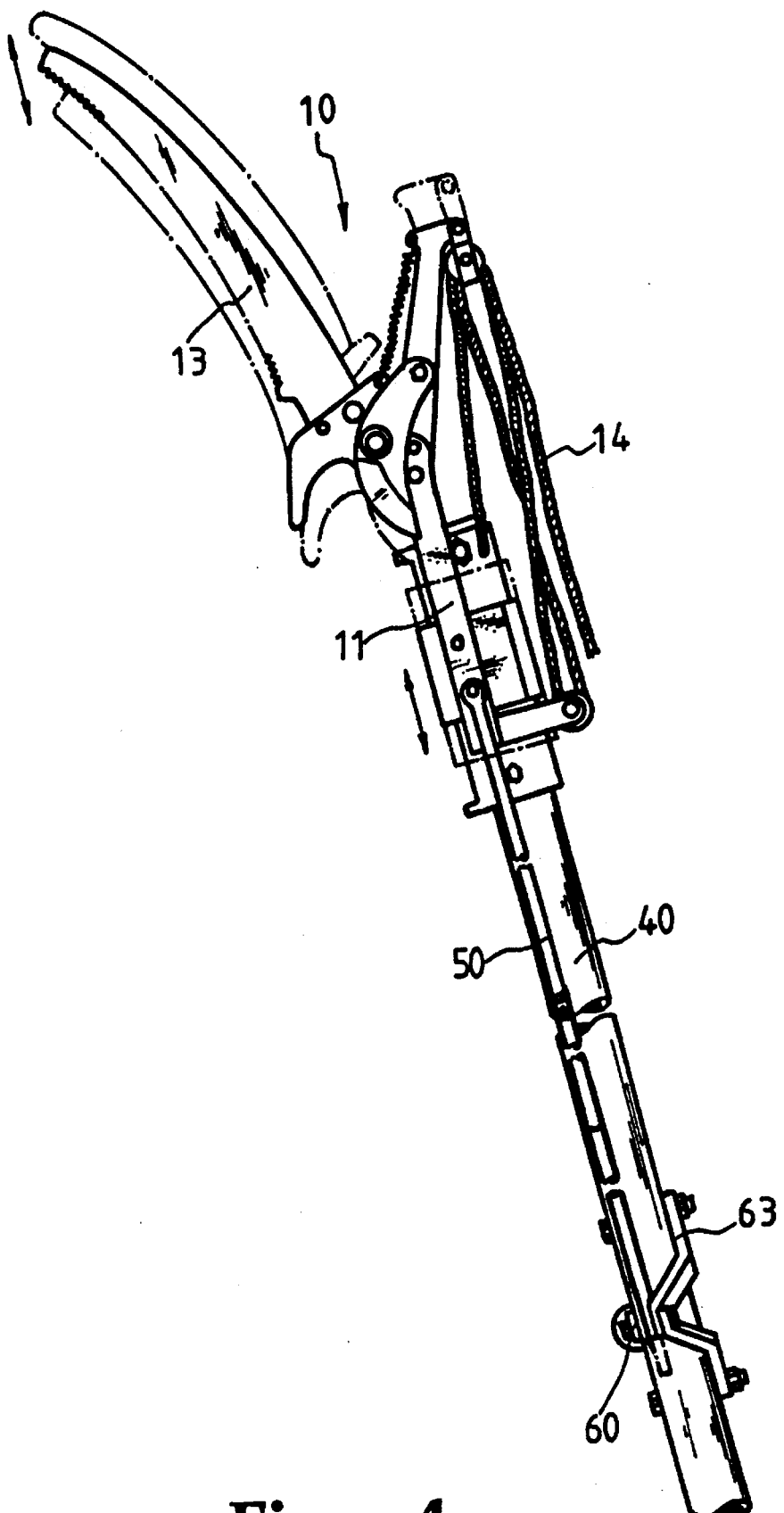
FIG. 4 shows a side schematic view of the present invention at work.

As illustrated in FIGS. 1 and 3, the pull rod 50 is composed of three segments and is fastened pivotally at the top end thereof with the bottom end of the fixation piece 11. The pull rod 50 is disposed pivotally in the long slot 61 of the rocking rod 60 which is provided at one end thereof with a grip 62 and is fastened pivotally at another end thereof with two connection rods 63. The connection rods 63 are arranged in a V-shaped configuration such that two connection rods 63 are fastened securely with the support rod 40 by means of a fastening bolt 64. The moving range of the rocking rod 60 is restricted by the head or nut of the fastening bolt 64. The fastening piece 11 is provided at one end of the bottom thereof with a pulley seat 16 which is in turn provided at one end thereof with a pulley 17 to which the pull cord 14 of the cutting set 10 is attached.

Figure 5:
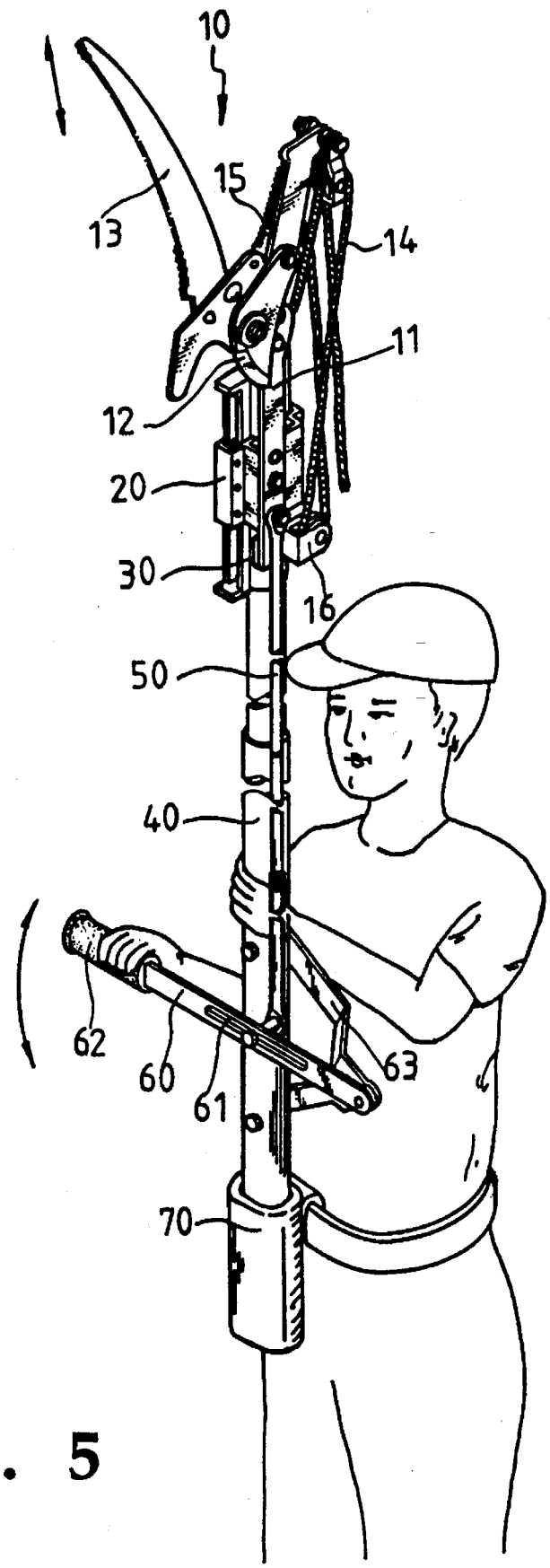
FIG. 5 shows a schematic view of the present invention in operation.
Figure 6:
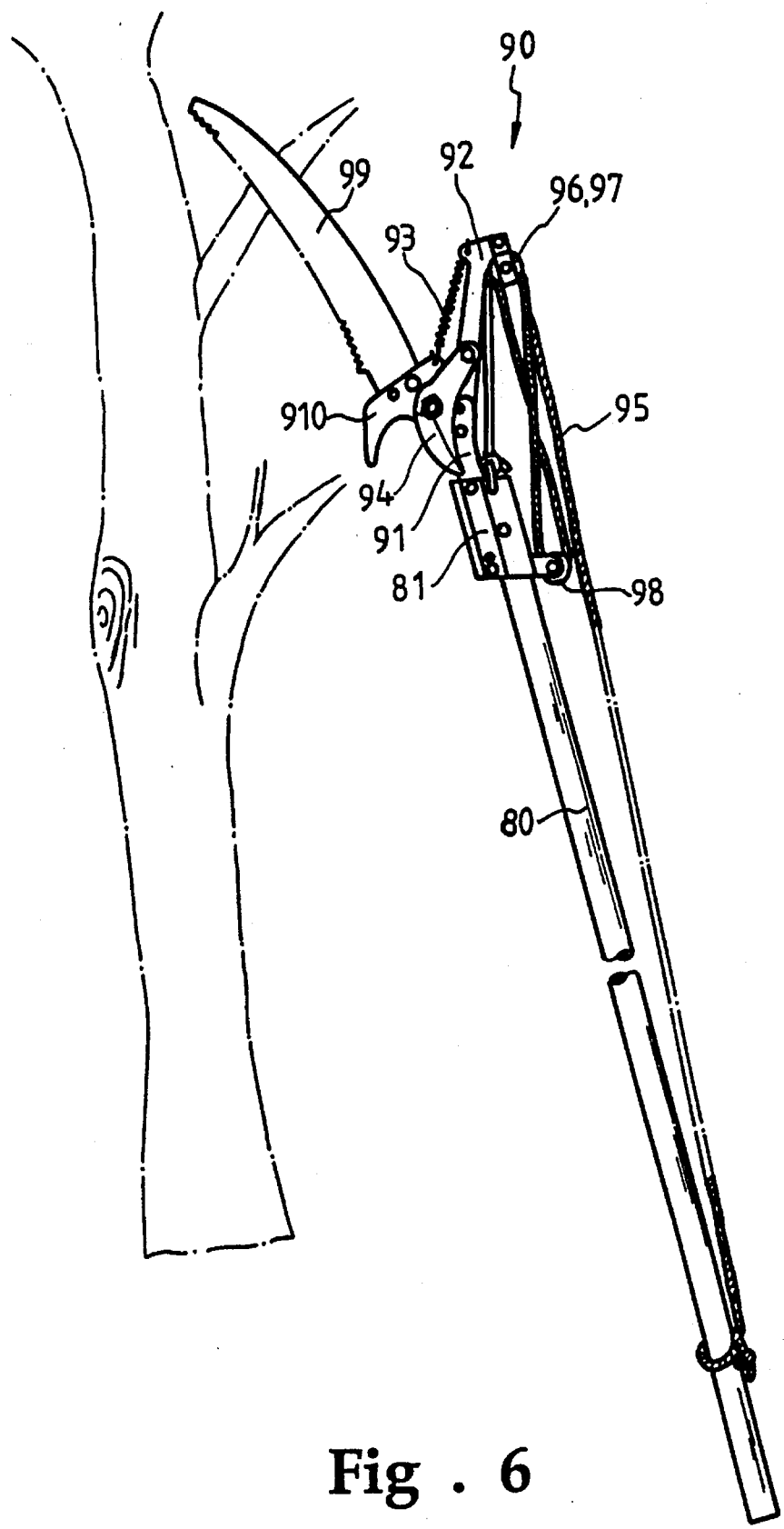
FIG. 6 shows a perspective view of a tree pruner of the prior art.

The operation of the tree pruner of the present invention is shown schematically in FIG. 5. The support rod 40 is received at the bottom end thereof in a pouch 70 fastened with the waist belt of a worker. The worker holds firmly the support rod 40 with one hand. In the meantime, the worker holds the grip 62 of the rocking rod 60 with another hand. As the grip 62 is swung up and down, the pull rod 50 is pushed upwards to push up the fastening piece 11 and the slide block 20. As a result, the cutting blade 13 is pushed upwards. When the rocking rod 60 is caused to swivel downwards, the cutting blade 13 is caused to move downwards to cut the twig intended to remove. The motions described above are repeated until the removal of the twig is completed. The chore of pruning twigs off a tree is therefore made easy, thanks to the improved tree pruner of the present invention.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A tree pruner, which comprises:

a support rod having a top end provided with a slide seat; and a cutting set fastened with said top end of said support rod and provided with a fastening piece, a cutting blade fastened pivotally with said fastening piece, a saw fastened with said fastening piece, a pull cord for regulating the motion of said cutting blade, and a tension spring for forcing said cutting blade back to an initial position thereof;

Wherein said fastening piece is mounted on a slide block capable of sliding up and down in said slide seat;

Wherein said fastening piece is fastened at a bottom end thereof with a pull rod which has a bottom end disposed pivotally in a slot of a rocking rod, said rocking rod provided at one end thereof with a grip fastened thereto, said rocking rod having another end fastened pivotally with two connection rods which are fastened with said support rod.

2. The tree pruner as defined in claim 1, wherein said slide seat is of a hollow construction and is fastened with said support rod by a fastening bolt, said slide seat having four slide rails extending from a periphery of said slide seat for enabling said slide block to move up and down; and wherein said slide block is of a rectangular hollow construction and is provided in one side thereof with a U-shaped frame having a space in which a head of said fastening bolt is received, said U-shaped frame being fastened with said fastening piece, said slide block further provided with four parallel ribs for forming four slide slots in which said four slide rails of said slide seat are disposed.

3. The tree pruner as defined in claim 2, wherein said slide slots of said slide block are provided respectively with a rolling wheel.

4. The tree pruner as defined in claim 1, wherein said two connection rods are fastened with said support rod such that said two connection rods are arranged in a V-shaped configuration.

5. The tree pruner as defined in claim 1, wherein said pull rod is composed of three segments which can be fastened together end to end.

6. The tree pruner as defined in claim 1, wherein said fastening piece is provided with a pulley seat fastened therewith such that said pulley seat is provided with a pulley to which said pull cord of said cutting set is attached.

* * * * *